(12) United States Patent
Smid et al.

(10) Patent No.: US 7,132,088 B2
(45) Date of Patent: Nov. 7, 2006

(54) GRANULAR MOVING-BED APPARATUS

(75) Inventors: Jiri Smid, Prague (CZ); Shu-San Hsiau, Chung Li (TW); Jing-T. Kuo, Taipei (TW); Chuen-Shii Chou, Ping Tung Hsien (TW); Ching-Yu Peng, Hsinchu (TW); Hom-Ti Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 722 days.

(21) Appl. No.: 10/271,726

(22) Filed: Oct. 17, 2002

(65) Prior Publication Data

US 2004/0076556 A1    Apr. 22, 2004

(51) Int. Cl.
F01N 3/08    (2006.01)

(52) U.S. Cl. .............. 422/176; 422/213; 422/216; 95/110; 34/171; 210/268

(58) Field of Classification Search ................ 422/216, 422/176, 213; 95/110; 210/268; 34/171
See application file for complete search history.

(56) References Cited

U.S. PATENT DOCUMENTS 4,455,282 A * 6/1984 Marquess et al. ........... 422/199

\* cited by examiner

*Primary Examiner*—Glenn Caldarola
*Assistant Examiner*—Alexis Wachtel
(74) *Attorney, Agent, or Firm*—Troxell Law Office, PLLC

(57) ABSTRACT

A granular moving-bed apparatus is introduced to have an inlet louvered wall, an outlet louvered wall opposing to the inlet louvered wall, a granular path formed in between, a plurality of serial roof-shaped flow-corrective elements located along the granular path, and a predetermined type of granular materials flowing inside the granular path. The inlet louvered wall and the outlet louvered wall are particularly constructed to form serial hopper-shaped structures that define the granular path. The roof-shaped flow-corrective element is systematically displaced with respect to the hopper-shaped structure by specific criteria so that problems of corrosions, plaques and stagnant zones formed to the louvered walls of the apparatus can be avoided.

28 Claims, 13 Drawing Sheets

GRANULAR MOVING-BED APPARATUS

BACKGROUND OF THE INVENTION (1) Field of the Invention

The invention relates to a granular moving-bed apparatus, and more particularly to a louver-type reactor which is used to remove inflow dusts, multi-contaminants such as $H_2S$, $SO_x$, $NO_x$, HCl, alkali, ammonia, etc.

(2) Description of the Prior Art

In the art of removing particles or multi-contaminants from a gas, a granular moving-bed filter or reactor is usually utilized to achieve so by introducing the contaminated gas to pass through a louver-type reactor which allows granular materials to flow slowly thereinside. The dust-removing mechanism of the louver-type reactor is carried out by sending the contaminated gas into the reactor through a louvered wall, then having the contaminated gas pass through a curtain formed by slow-moving granular materials inside the reactor so as to leave the particles and the multi-contaminants with the granular materials, and finally fleeing the gas with a substantial clean state through another louvered wall of the reactor. In the art, the apparatus described above is called a granular moving-bed apparatus.

Referring to FIG. 1, a schematic view of a conventional granular moving-bed reactor is shown. The reactor 4 includes an inlet louvered wall 41, an outlet louvered wall 42 and a granular path 43 formed in between for flowing the granular materials 2. As shown, the contaminated gas flow 3 is introduced into the reactor 4 through the inlet louvered wall 41, then contacts with the slow-moving granular materials 2 moving slowly along the path 43, and flows out of the reactor 4 from the outlet louvered wall 42 as a filtered gas flow 3'. In both the inlet and outlet louvered walls 41 and 43 as shown, it is noted that each of the side walls 41 and 43 of the reactor 4 is formed as a shutter wall so that a plurality of serial hopper-shaped structures 44 can be obtained. The hopper-shaped structure 44 is profiled by an inlet guide plate 411 of the inlet louvered wall 41 and an outlet guide plate 421 of the outlet louvered wall 42, by which the granular materials can be stacked and move slowly along the path 43 so as to generate an effective filtration curtain for the penetrating gas flow 3 and 3'.

Referring to FIG. 2A and FIG. 2B, computer-simulation results for downstream velocity distributions on selected surfaces of the hopper-shaped structure 44 are shown, in which the inclination θ for both the inlet and outlet guide plates 411 and 421 is 40°, the V symbols the downstream velocity, and the U symbols the lateral velocity. As shown in FIG. 2B, it is easy to see that non-uniform distribution of V exists in all selected horizontal levels a, b, c, d and e.

By realizing the results of FIG. 2B, a schematic view of the flow of the granular materials 2 as shown in FIG. 3 can be obtained. As shown, in each hopper-shaped structure 44, a flowing core zone 21, a quasi-stagnant zone 22 and a stagnant zone 23 are formed. Upon such a granular flow distribution in the hopper-shaped structure 44, it is inevitable that chemical products from reactions or dust from filtration between the granular materials and the contaminated gas flow 3 residue along the inlet and outlet guide plates 411 and 421, and by which problems of corrosion, plaques, stagnant zones and so on can be formed to the side walls 41 and 42.

It is obvious that the aforesaid problems of the reactor 4 are mainly caused by the non-uniform flow distribution in each hopper-shaped structure 44. In the art, to achieve a uniform flow distribution of the granular materials 2 along the granular path 43 of the reactor 4, some efforts have been made to build in various flow-dividing structures into each hopper-shaped structure 44.

One of aforesaid efforts is Germany patent number DE 3830618 A1 by Priefer et al., whose major technique is shown in FIG. 4. Priefer et al. disclose a granular moving-bed apparatus whose hopper structure 44 includes a roof-shaped divider 441 located symmetrically in the granular path 43 to bifurcate the granular flow. In Priefer et al., the inclinations θ of the inlet guide plate 411 and the outlet guide plate 421 and the roof inclination α of the roof-shaped divider 441 are all 45°. A basic assumption to Priefer et al. is that the flow of the granular materials in the granular path will be a perfect flow. Therefore, by arranging the tip 4411 of the roof-shaped divider 411 flush with an image line connecting the lower ends 4110 and 4210 of the inlet guide plate 411 and the outlet guide plate 421, respectively, flux on each flow section of the granular path 43 will be the same so that the uniform flow distribution of the granular materials 2 can be achieved.

Nevertheless, it is well known that the ideal situation does never exist in a real world. Even that a basic model for including in-flow dividers has been taught by Priefer et al., still, a practical and satisfied apparatus can only be achieved on a trial-and-error base. Apparently, the problem yet to be resolved in the art is how an optimal placement of the roof-shaped structure can be determined. Especially, it is obvious that different granular materials will present different properties, flowability for instance, and the filtration results as well. Therefore, unless an answer or a methodology can be provided, or the cost and labor in constructing an efficient granular moving-bed apparatus for air filtration cannot be saved.

SUMMARY OF THE INVENTION

Accordingly, it is a primary object of the present invention to provide a granular moving-bed apparatus with improved roof-shaped dividers whose displacements can be systematically determined and by which problems of corrosions, plaques, stagnant zones and so on formed to the side walls of the apparatus can be avoided.

The granular moving-bed apparatus in accordance with the present invention includes an inlet louvered wall, an outlet louvered wall opposing to the inlet louvered wall, a granular path having a centerline formed between the inlet louvered wall and the outlet louvered wall, and a predetermined type of granular materials flowing inside the granular path. Each of the inlet louvered wall and the outlet louvered wall can be constructed as a shutter wall so that a plurality of serial hopper-shaped structures can be formed. Equally, in the present invention, each of the hopper-shaped structures is formed by an inlet guide plate of the inlet louvered wall and an outlet guide plate of the outlet louvered wall.

The inlet guide plate, inclined downstream (with respect to the flow of granular materials inside the granular path) toward the centerline by an angle "$\gamma_{in}$", further has an inlet lower end and an inlet upper end. Similarly, the outlet guide plate, inclined by an angle "$\gamma_{out}$", further has an outlet lower end and an outlet upper end. Also, in this aspect of the invention, each of the hopper-shaped structures can further have an inlet upright fence standing at the inlet upper end of the inlet guide plate and an outlet upright fence standing at the outlet upper end of the outlet guide plate, both of them for preventing the granular materials from flowing out of the granular path.

In the present invention, the granular path includes thereinside a plurality of serial roof-shaped flow-corrective elements, in which each of the roof-shaped flow-corrective elements is corresponding to one of the serial hopper-shaped structures and further has an inlet corrective plate adjacent to the inlet guide plate and an outlet corrective plate adjacent to the outlet guide plate. The inlet corrective plate can further have an inlet corrective tip, and on the other hand the outlet corrective plate can also have an outlet corrective tip.

In the invention, a length "$b_{in}$" is defined as the distance measured from the inlet upper end to an image line parallel to a centerline of the granular path and passing the inlet corrective tip. A length "$b_{out}$" is defined as the distance measured from the outlet upper end to another image line parallel to the centerline of the granular path and passing the outlet corrective tip. A length "$S_{in}$" is defined as the distance measured from the inlet upper end to a further image line perpendicular to the centerline and passing the inlet lower end of a preceding hopper-shaped structure. Also, a length "$S_{out}$" is defined as the distance measured from the outlet upper end to one more image line perpendicular to the centerline and passing the outlet lower end of the preceding hopper-shaped structure.

In accordance with the present invention, the major characteristics of the granular moving-bed apparatus are that (1) the inclination of the inlet corrective plate is equal to the $\gamma_{in}$, (2) the inclination of the outlet corrective plate is equal to the $\gamma_{out}$, (3) the inlet corrective tip is arranged in a position above the inlet upper end by an inlet predetermined distance "$H_{in}$" ranged between 0.1 $S_{in}$ to 0.9 $S_{in}$, and (4) the outlet corrective tip is arranged in another position above the outlet upper end by an outlet predetermined distance "$H_{out}$" ranged between 0.1 $S_{out}$ to 0.9 $S_{out}$.

In the art, the granular materials can be classified into three categories: a free-flowing cohesion-less granular material whose effective angle of internal friction is ranged from 15° to 40°, a medium-flowability granular materials whose effective angle of internal friction is ranged from 40° to 60°, and a cohesive granular material whose effective angle of internal friction is ranged from 60° to 75°.

In the case that the granular material used is the free-flowing cohesion-less granular material, the $H_{in}$ can be equal to 0.1 $S_{in}$ if $H_o<0.1\ S_{in}$, can be the $H_o$ if $0.1\ S_{in} \leq H_o < 0.9\ S_{in}$, and can be 0.9 $S_{in}$ if $0.9\ S_{in} \leq H_o$; in which $H_o = b_{in} \tan(34° - 0.138\gamma_{in})$.

In the case that the granular material used is the medium-flowability granular material, then the $H_{in}$ can be equal to 0.1 $S_{in}$ if $H_o < 0.1\ S_{in}$, can be the $H_o$ if $0.1\ S_{in} \leq H_o < 0.9\ S_{in}$ and can be 0.9 $S_{in}$ if $0.9\ S_{in} \leq H_o$; in which $H_o = b_{in} \tan(26.4° - 0.072\gamma_{in})$.

In the case that the granular material used is the cohesive granular material, then the $H_{in}$ can be equal to 0.1 $S_{in}$ if $H_o < 0.1\ S_{in}$, can be the $H_o$ if $0.1\ S_{in} \leq H_o < 0.9\ S_{in}$ and can be 0.9 $S_{in}$ for $0.9\ S_{in} \leq H_o$; in which $H_o = b_{in} \tan(10° - 0.034\gamma_{in})$.

On the other hand, previous methodology of defining the $H_{in}$ can be also applied to determine the $H_{out}$. That is, in the case of the granular material being the free-flowing cohesion-less granular material, the $H_{out}$ can be 0.1 $S_{out}$ for $H_o < 0.1\ S_{out}$, $H_o$ for $0.1\ S_{out} \leq H_o < 0.9\ S_{out}$ and 0.9 $S_{out}$ for $0.9\ S_{out} \leq H_o$; similarly, in which $H_o = b_{out} \tan(34° - 0.138\gamma_{out})$. In the case of the granular material being the medium-flowability granular material, the $H_{out}$ can be 0.1 $S_{out}$ for $H_o < 0.1\ S_{out}$, $H_o$ for $0.1\ S_{out} \leq H_o < 0.9\ S_{out}$ and 0.9 $S_{out}$ for $0.9\ S_{out} \leq H_o$; in which $H_o = b_{out} \tan(26.4° - 0.072\ \gamma_{out})$. Also, in the case of the granular material being the cohesive granular material, the $H_{out}$ can be 0.1 $S_{out}$ for $H_o < 0.1\ S_{out}$, $H_o$ for $0.1\ S_{out} \leq H_o < 0.9\ S_{out}$ and 0.9 $S_{out}$ for $0.9\ S_{out} \leq H_o$; in which $H_o = b_{out} \tan(10° - 0.034\gamma_{out})$.

In the present invention, the roof-shaped flow-corrective element can be a compact type whose inlet corrective tip of the inlet corrective plate and the outlet corrective tip of the outlet corrective plate are overlapped to form the roof-shaped flow-corrective element as a unit piece, or a separate type whose inlet corrective tip of the inlet corrective plate and the outlet corrective tip of the outlet corrective plate are separated by a substantial spacing.

In one embodiment of the present invention, the inlet corrective tip of the inlet corrective plate of the roof-shaped flow-corrective elements can lie on the center line.

In one embodiment of the present invention, the outlet corrective tip of the outlet corrective plate of the roof-shaped flow-corrective element can lie on the center line.

In the present invention, the $\gamma_{in}$ can be equal to the $\gamma_{out}$. Similarly, the $b_{in}$ can be equal to the $b_{out}$, $S_{in}$ can be equal to the $S_{out}$, and the $H_{in}$ can be equal to the $H_{out}$.

In another aspect of the present invention, the hopper-shaped structure of the granular moving-bed apparatus does not include the upright fences. In this aspect, aforesaid computations on the $H_{in}$ and the $H_{out}$ can still be applied with the inlet and outlet hill-foot points of the granular materials piling inside the hopper-shaped structure being the basic points for the computation. That is, the "$b_{in}$" is defined as the distance measured from the inlet hill-foot point to a line parallel to the centerline of the granular path and passing the inlet corrective tip, the "$b_{out}$" is defined as the distance measured from the outlet hill-foot point to a line parallel to the centerline of the granular path and passing the outlet corrective tip, the "$S_{in}$" is defined as the distance measured from the inlet hill-foot point to a line perpendicular to the centerline and passing the inlet lower end of a preceding hopper-shaped structure, and the "$S_{out}$" is defined as the distance measured from the outlet hill-foot point to a line perpendicular to the centerline and passing the outlet lower end of a preceding hopper-shaped structure.

All these objects are achieved by the granular moving-bed apparatus described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a granular moving-bed apparatus. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

In the present invention, the major task is to prevent the louvered side walls of the granular moving-bed apparatus from having corrosions and forming stagnant zones and the like by preferably determining the displacement of the inflow roof-shaped flow-corrective elements so that the granular materials can smoothly flow along the granular path defined by the louvered side walls and by which the filtration efficiency of the apparatus can be ensured. To achieve this goal, various computations and modifications have been carried out so as to obtain preferred numerals for constructing the apparatus of the invention.

In order to achieve consistency of following descriptions upon the present invention, elements with similar function but differently profiled are assigned by the same label and name.

Basically, the granular moving-bed apparatus of the present invention is resembled to the apparatus in the art, but provides a preferred and determined arrangement upon the serial hopper-shaped structures thereinside. To have following discussion focus on the present invention, major efforts thereafter will be put on the explanations of the configuration of the hopper-shaped structure, and thus cross-sectional views of various embodiments to present two consecutive hopper-shaped structures for the invention are utilized in accompanying drawings.

As described above, the granular moving-bed apparatus in accordance with the present invention includes an inlet louvered wall, an outlet louvered wall opposing to the inlet louvered wall, a granular path having a centerline formed between the inlet louvered wall and the outlet louvered wall. The granular path is used to flow a predetermined type of granular materials. Each of the inlet louvered wall and the outlet louvered wall can be constructed as a shutter wall so that a plurality of hopper-shaped structures can be formed in series. Similarly in the present invention, each of the hopper-shaped structures is formed by an inlet guide plate of the inlet louvered wall and an outlet guide plate of the outlet louvered wall.

Figure 5A:
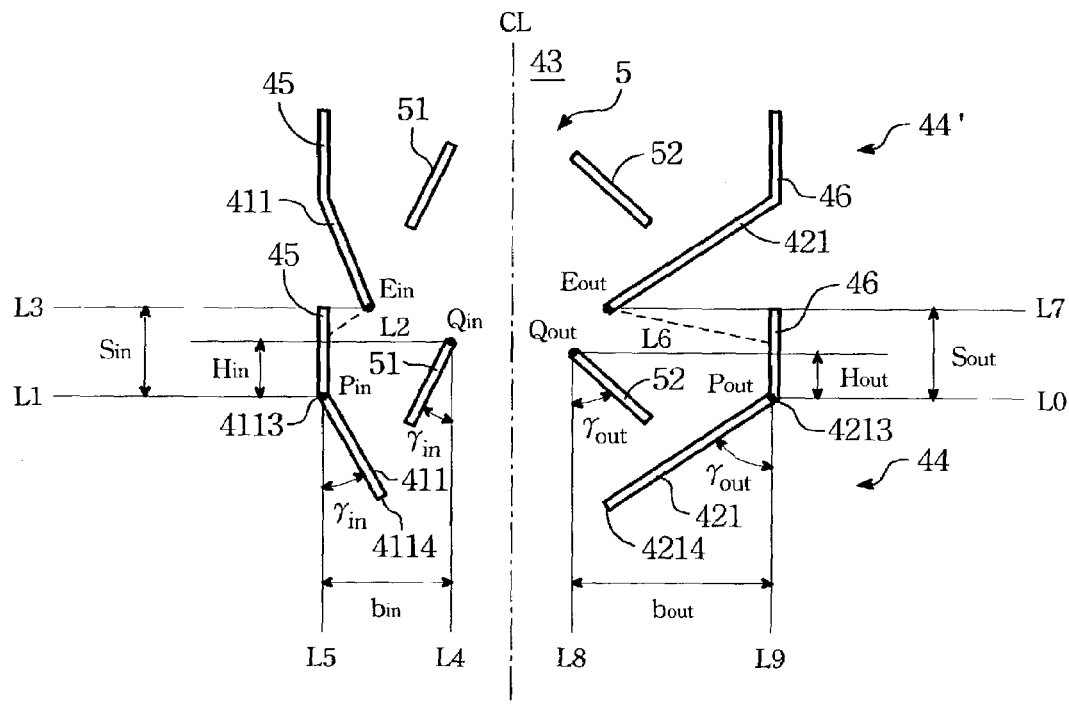
FIG. 5A is a schematic cross-sectional view of a first embodiment of two adjacent hopper-shaped structures of the granular moving-bed apparatus in according to a first aspect of the present invention.

Referring now to FIG. 5A, two consecutive hopper-shaped structures of a first embodiment according to a first aspect of the present invention are illustrated. As shown, each of the hopper-shaped structures 44 and 44' includes the inlet guide plate 411 and the outlet guide plate 421. The inlet guide plate 411 is inclined downstream toward the centerline CL by an angle "$\gamma_{in}$", with respect to the flow of granular materials inside the granular path 43. Further, the inlet guide plate 411 has an inlet lower end 4114 and an inlet upper end 4113. Also, an inlet upright fence 45 for avoiding the granular materials to over flow the hopper-shaped structure 44 or 44' is included by standing at the inlet upper end 4113 of the inlet guide plate 411.

Similar to the inlet guide plate 411, the outlet guide plate 412 is inclined by an angle "$\gamma_{out}$" and further has an outlet lower end 4214 and an outlet upper end 4213. Also, an outlet upright fence 46 for avoiding the granular materials to over flow the hopper-shaped structure 44 or 44' is included by standing at the outlet upper end 4213 of the outlet guide plate 421.

As shown, each of the hopper-shaped structures 44 and 44' in the present invention includes a roof-shaped flow-corrective element 5 for bifurcating the flow of the granular materials inside the granular path 43. The roof-shaped flow-corrective element 5 has an inlet corrective plate 51 located adjacent to the inlet guide plate 411 and an outlet corrective plate 52 located adjacent to the outlet guide plate 421. On the upstream side, the inlet corrective plate 51 and the outlet corrective plate 52 can further have an inlet corrective tip Qin and an outlet corrective tip Qout. In the present invention, the inclination of the inlet corrective plate 51 with the inlet corrective tip Qin close to the centerline CL of the granular path 43 is equal to the $\gamma_{in}$, while the inclination of the outlet corrective plate 52 with the outlet corrective tip Qout close to the centerline CL is equal to the $\gamma_{out}$.

As shown, a length "$b_{in}$" is used to define the distance between a line L5 parallel to the centerline CL and passing the inlet upper end 4113 and a line L4 parallel to the centerline CL and passing the inlet corrective tip Qin, and a length "$b_{out}$" is used to define the distance between a line L9 parallel to the centerline CL and passing the outlet upper end 4213 and a line L8 parallel to the centerline CL and passing the outlet corrective tip Qout.

As shown, a length "$S_{in}$" is defined as the distance between a line L1 passing the inlet upper end 4113 of the hopper-shaped structure 44 and perpendicular to the centerline CL and a line L3 passing the inlet lower end Ein of a preceding hopper-shaped structure 44' and perpendicular to the centerline CL. Also, a length "$S_{out}$" is defined as the distance between a line Lo passing the outlet upper end 4213 of the hopper-shaped structure 44 and perpendicular to the centerline CL and a line L7 passing the outlet lower end Eout of the preceding hopper-shaped structure 44' and perpendicular to the centerline CL.

Figure 1:
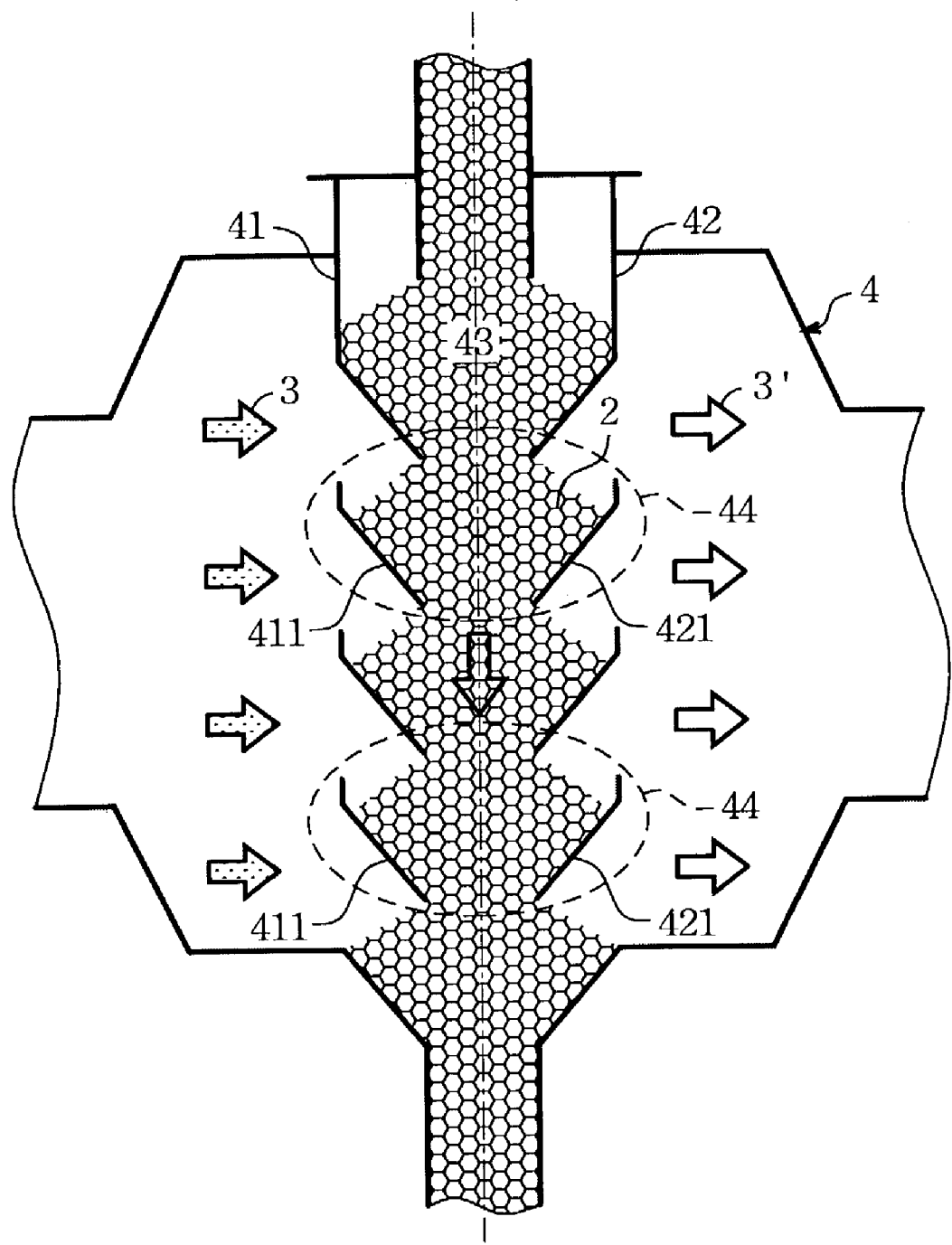
FIG. 1 is a schematic view of a conventional granular moving-bed reactor.
Figure 2:
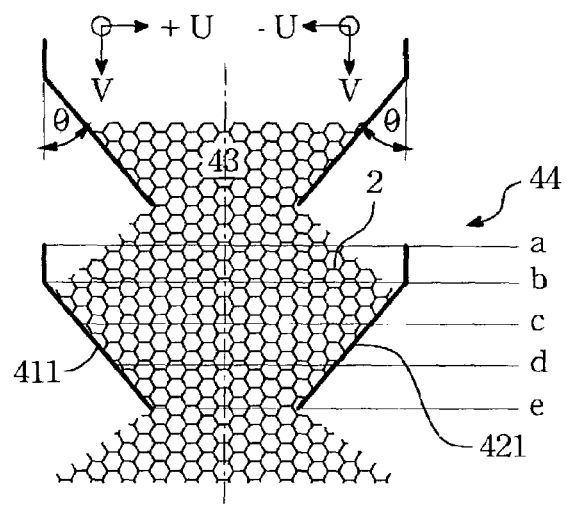
FIG. 2A is a schematic enlarged view of hopper-shaped structures of FIG. 1.
FIG. 2B is a plot of computer-simulation results for downstream velocity distributions on selected surfaces of the hopper-shaped structure of FIG. 2A.
Figure 2:
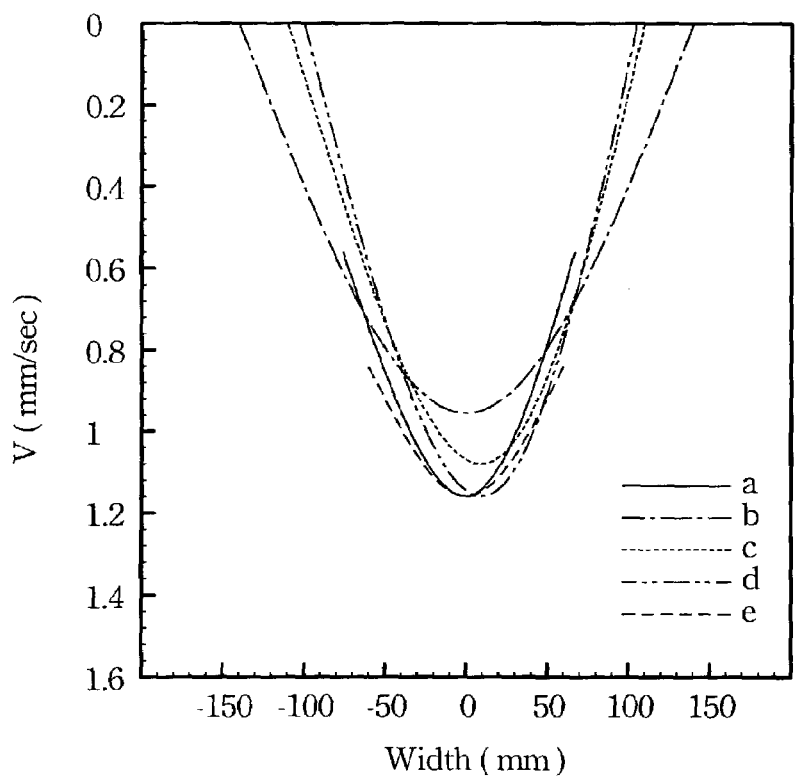
Figure 3:
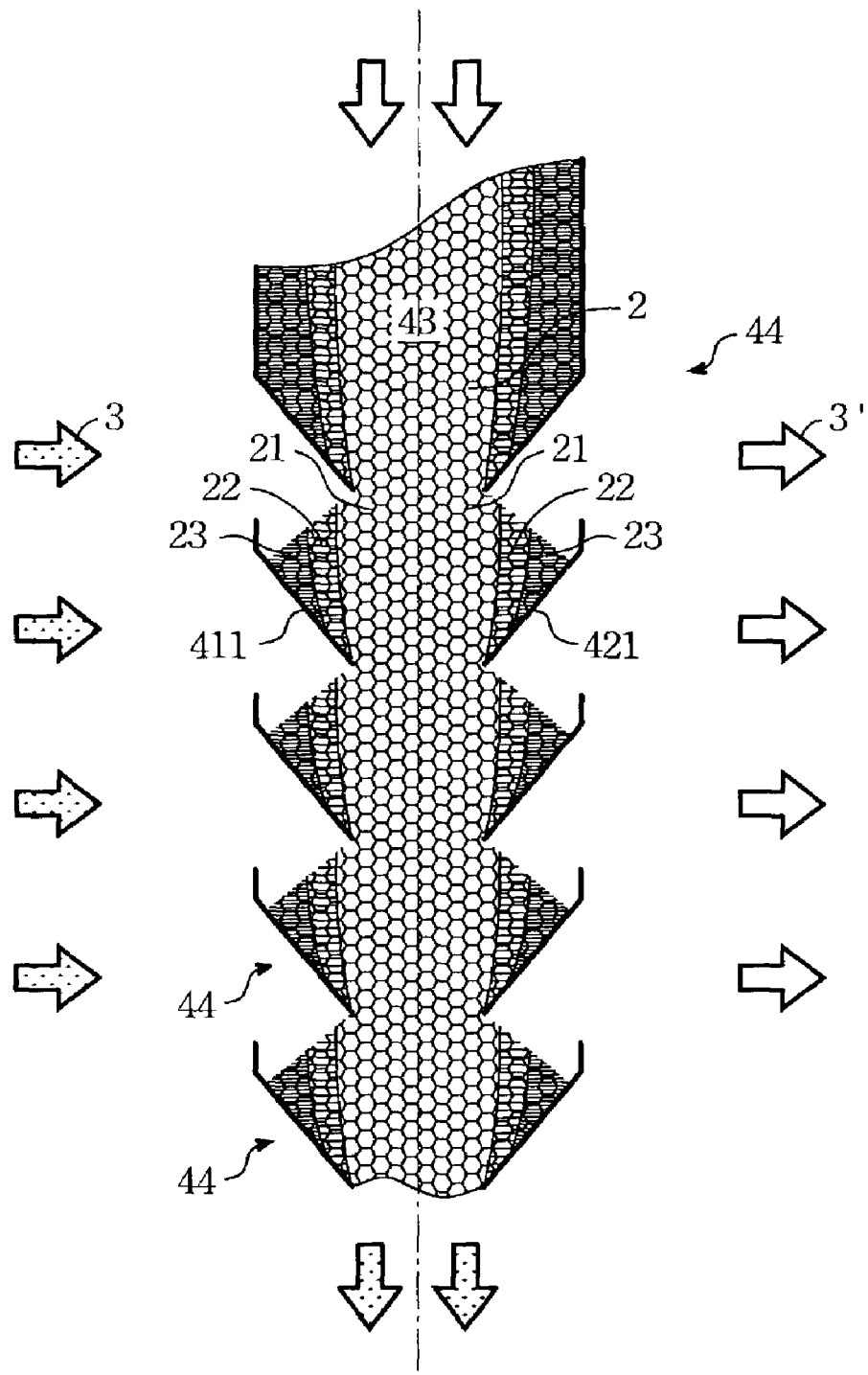
FIG. 3 is a schematic view of the flow of the granular materials according to FIG. 2B.
Figure 4:
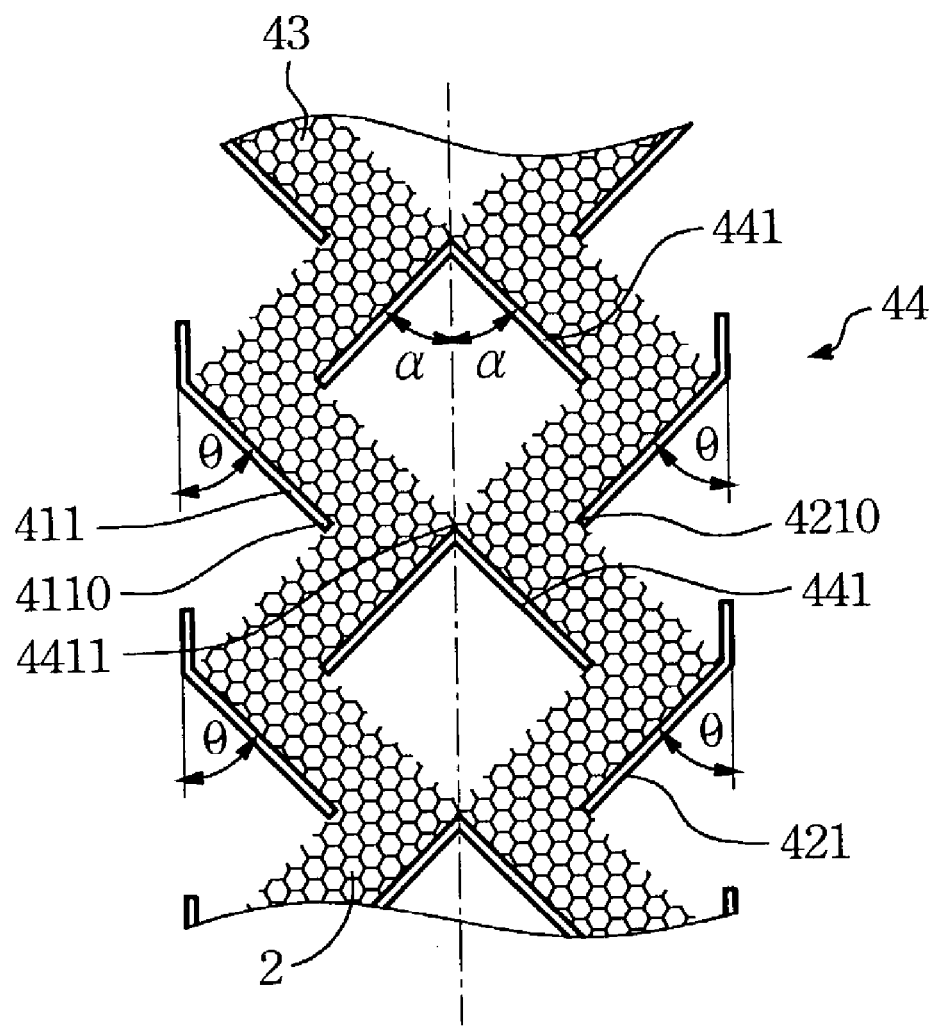
FIG. 4 is a schematic view of hopper-shaped structures with roof-shaped dividers according to Germany patent number DE 3830618 A1.

In accordance with the present invention, it is noted that the preferred position for the roof-shaped flow-corrective element 5 superior to the conventional design as described FIG. 4, for example, is determined by various computations and testing, which are not shown herein. Yet, specific and precise criteria for obtaining a preferred arrangement of the roof-shaped flow-corrective element 5 are provided as follow.

Criterion 1: The inlet corrective tip Qin is arranged in a position above the inlet upper end 4113 (Pin) by an inlet predetermined distance "$H_{in}$" ranged between 0.1 $S_{in}$ to 0.9 $S_{in}$.

Criterion 2: The outlet corrective tip Qout is arranged in a position above the outlet upper end 4213 (Pout) by an outlet predetermined distance "$H_{out}$" ranged between 0.1 $S_{out}$ to 0.9 $S_{out}$.

In the art, the granular materials can be classified into three categories: a free-flowing cohesion-less granular material whose effective angle of internal friction is ranged from 15° to 40°, a medium-flowability granular materials whose effective angle of internal friction is ranged from 40° to 60°, and a cohesive granular material whose effective angle of internal friction is ranged from 60° to 75°. To have the criteria better suited to various material properties, more specific criteria are provided as follow.

Criterion 1.1: For the free-flowing cohesion-less granular material, $H_{in}=$
a) 0.1 $S_{in}$ if $H_o<0.1\ S_{in}$,
b) $H_o$ if $0.1\ S_{in} \leq H_o < 0.9\ S_{in}$, and
c) 0.9 $S_{in}$ if $0.9\ S_{in} \leq H_o$;
in which $H_o = b_{in} \tan(34°-0.138\gamma_{in})$.

Criterion 1.2: For the medium-flowability granular material, $H_{in}=$
a) 0.1 $S_{in}$ if $H_o<0.1\ S_{in}$,
b) $H_o$ if $0.1\ S_{in} \leq H_o < 0.9\ S_{in}$, and
c) 0.9 $S_{in}$ if $0.9\ S_{in} \leq H_o$;
in which $H_o = b_{in} \tan(26.4°-0.072\gamma_{in})$.

Criterion 1.3: For the cohesive granular material, $H_{in}=$
a) 0.1 $S_{in}$ if $H_o<0.1\ S_{in}$,
b) $H_o$ if $0.1\ S_{in} \leq H_o < 0.9\ S_{in}$, and
c) 0.9 $S_{in}$ if $0.9\ S_{in} \leq H_o$;
in which $H_o = b_{in} \tan(10°-0.034\gamma_{in})$.

Criterion 2.1: For the free-flowing cohesion-less granular material, $H_{out}=$
a) 0.1 $S_{out}$ if $H_o<0.1\ S_{out}$,
b) $H_o$ if $0.1\ S_{out} \leq H_o < 0.9\ S_{out}$, and
c) 0.9 $S_{out}$ if $0.9\ S_{out} \leq H_o$;
in which $H_o = b_{out} \tan(34°-0.138\gamma_{out})$.

Criterion 2.2: For the medium-flowability granular material, $H_{out}=$
a) 0.1 $S_{out}$ if $H_o<0.1\ S_{out}$,
b) $H_o$ if $0.1\ S_{out} \leq H_o < 0.9\ S_{out}$, and
c) 0.9 $S_{out}$ if $0.9\ S_{out} \leq H_o$;
in which $H_{o=bout} \tan(26.4°-0.072\gamma_{out})$.

Criterion 2.3: For the cohesive granular material, $H_{out}=$
a) 0.1 $S_{out}$ if $H_o<0.1\ S_{out}$,
b) $H_o$ if $0.1\ S_{out} \leq H_o < 0.9\ S_{out}$, and
c) 0.9 $S_{out}$ if $0.9\ S_{out} \leq H_o$;
in which $H_o = b_{out} \tan(10°-0.034\gamma_{out})$.

Though the inlet corrective plate 51 and the outlet corrective plate 52 of the roof-shaped flow-corrective element 5 in FIG. 5A are separated by a predetermined spacing, yet alternatives of the arrangement of the roof-shaped flow-corrective element 5 are valid and can still applied all of the above criteria. FIG. 5B through FIG. 5F show those options.

Figure 5B:
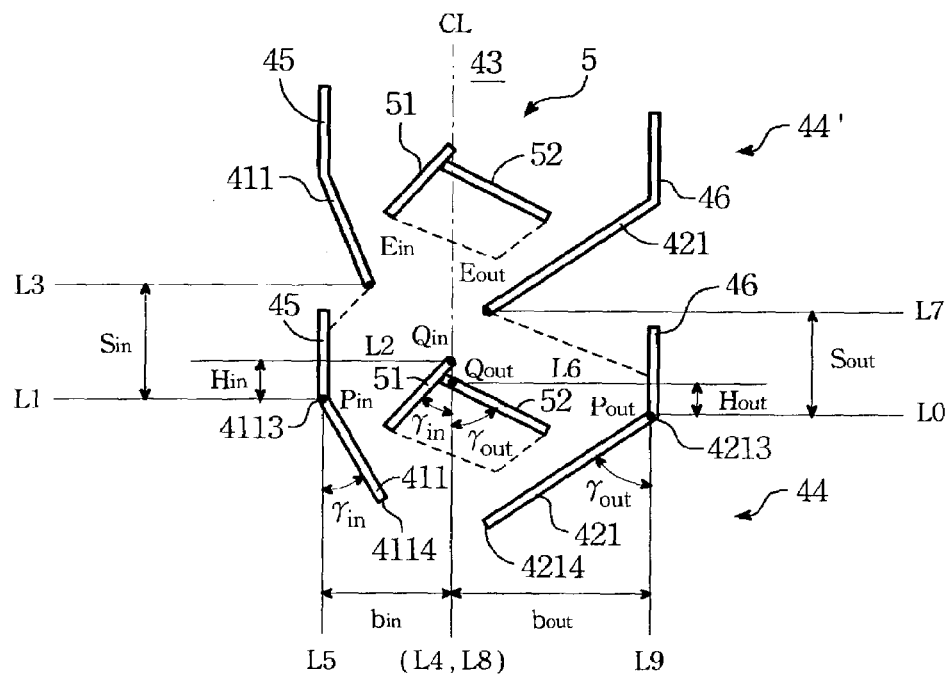
FIG. 5B is a schematic cross-sectional view of a second embodiment of two adjacent hopper-shaped structures of the granular moving-bed apparatus in according to the first aspect of the present invention.

Referring now to FIG. 5B, a second embodiment for the hopper-shaped structure 44 or 44' in accordance with the first aspect of the present invention is shown by a cross-sectional view. Different to the first embodiment of FIG. 5A, this embodiment has the outlet corrective plate 52 contact with a middle of the inlet corrective plate 51 and has the Qin lying on the centerline CL. Under this situation, the L4, L8 and CL are overlapped and the Qout for determining the $H_{out}$ is now the intersection point of the CL and the outlet corrective plate 52.

Also, it is noted, typically shown in FIG. 5B, that the length of the inlet corrective plate 51 can differ from the length of the outlet corrective plate 52 for the roof-shaped flow-corrective element 5 of the present invention.

Figure 5C:
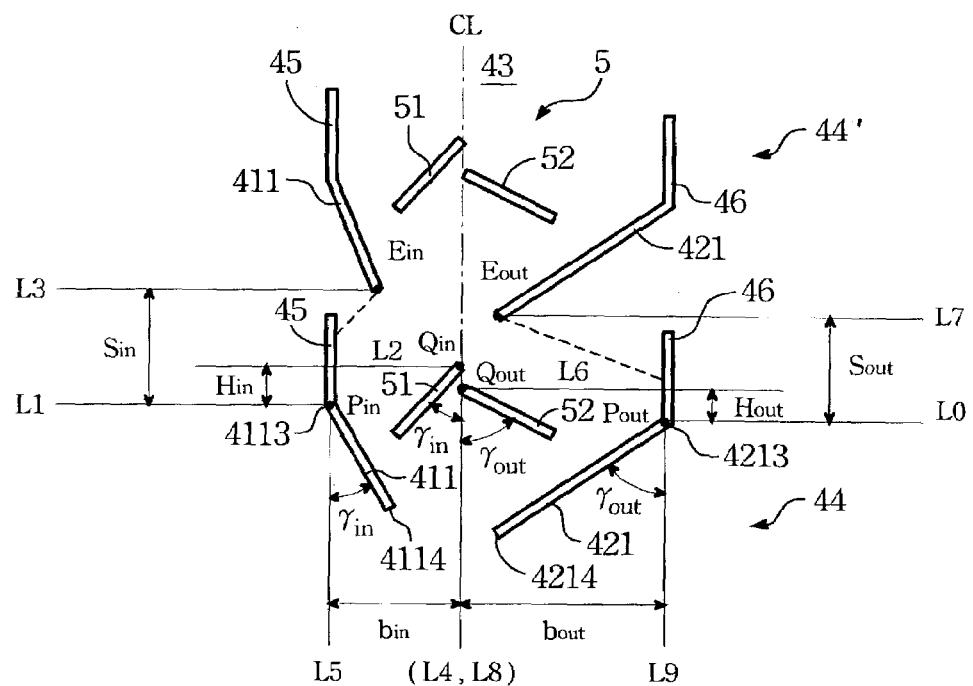
FIG. 5C is a schematic cross-sectional view of a third embodiment of two adjacent hopper-shaped structures of the granular moving-bed apparatus in according to the first aspect of the present invention.

Referring now to FIG. 5C, a third embodiment for the hopper-shaped structure 44 or 44' in accordance with the first aspect of the present invention is shown by a cross-sectional view. Different to the first embodiment of FIG. 5A, this embodiment has both the inlet corrective tip Qin and the outlet corrective tip Qout lying on the centerline CL, by a spacing in between. Under this situation, the L4, L8 and CL are overlapped.

Figure 5D:
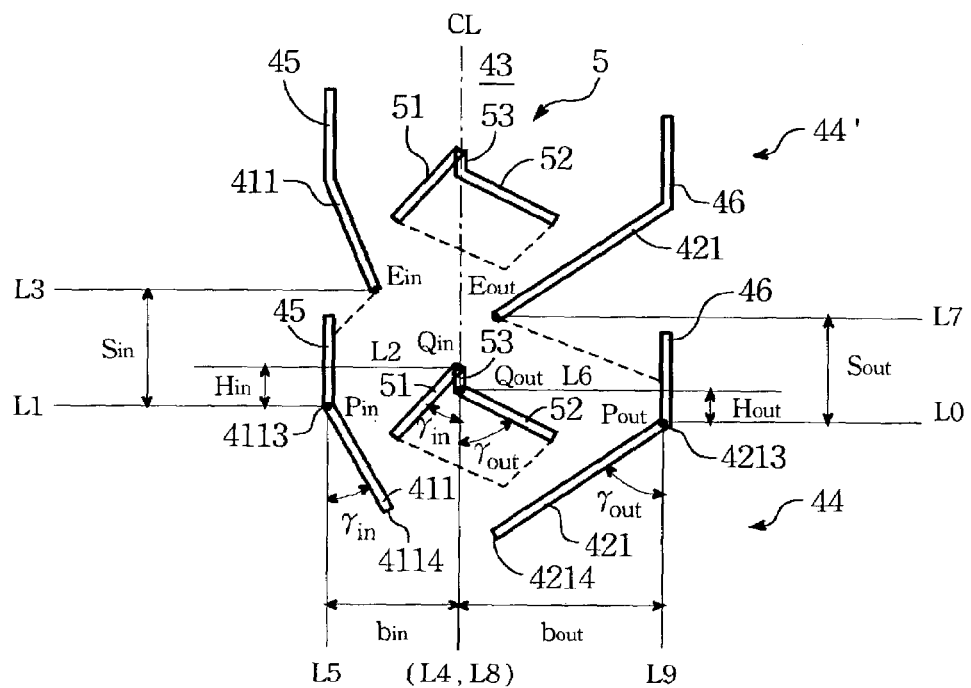
FIG. 5D is a schematic cross-sectional view of a fourth embodiment of two adjacent hopper-shaped structures of the granular moving-bed apparatus in according to the first aspect of the present invention.

Referring now to FIG. 5D, a fourth embodiment for the hopper-shaped structure 44 or 44' in accordance with the first aspect of the present invention is shown by a cross-sectional view. Different to the third embodiment of FIG. 5C, a connecting plate 53 is used to connect the Qin and the Qout. Under this situation, the L4, L8 and CL are overlapped and a room will be generated under the roof-shaped flow-corrective element 5.

Figure 5E:
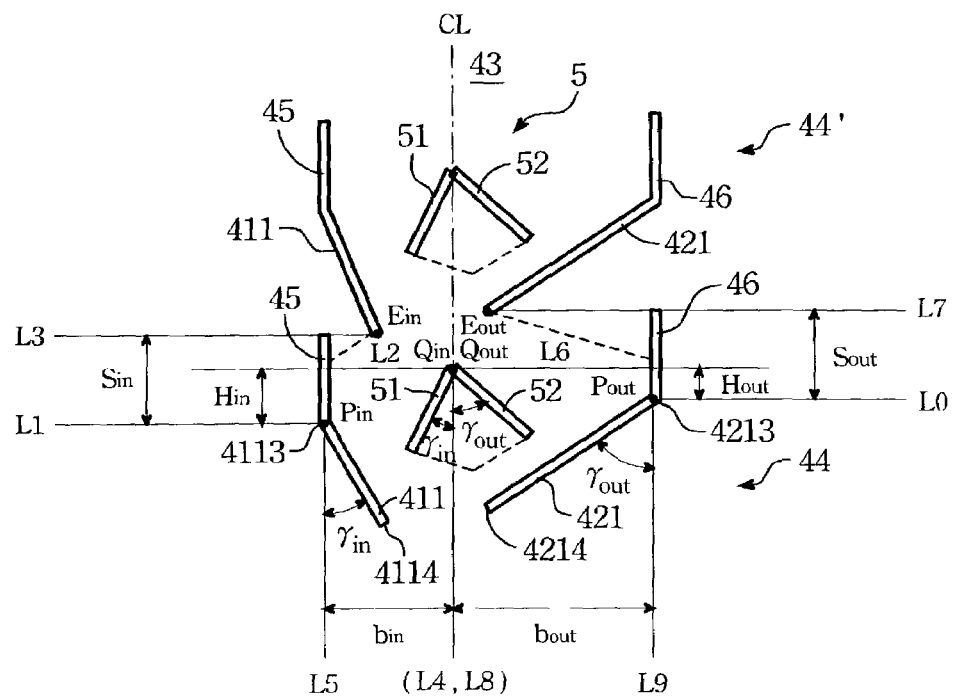
FIG. 5E is a schematic cross-sectional view of a fifth embodiment of two adjacent hopper-shaped structures of the granular moving-bed apparatus in according to the first aspect of the present invention.

Referring now to FIG. 5E, a fifth embodiment for the hopper-shaped structure 44 or 44' in accordance with the first aspect of the present invention is shown by a cross-sectional view. Different to the first embodiment of FIG. 5A, this embodiment has both the inlet corrective tip Qin and the outlet corrective tip Qout overlapped and lying on the centerline CL. Under this situation, the L4, L8 and CL are overlapped, the L2 and L8 are overlapped, and the roof-shaped flow-corrective element 5 is formed as a perfect roof shape.

Figure 5F:
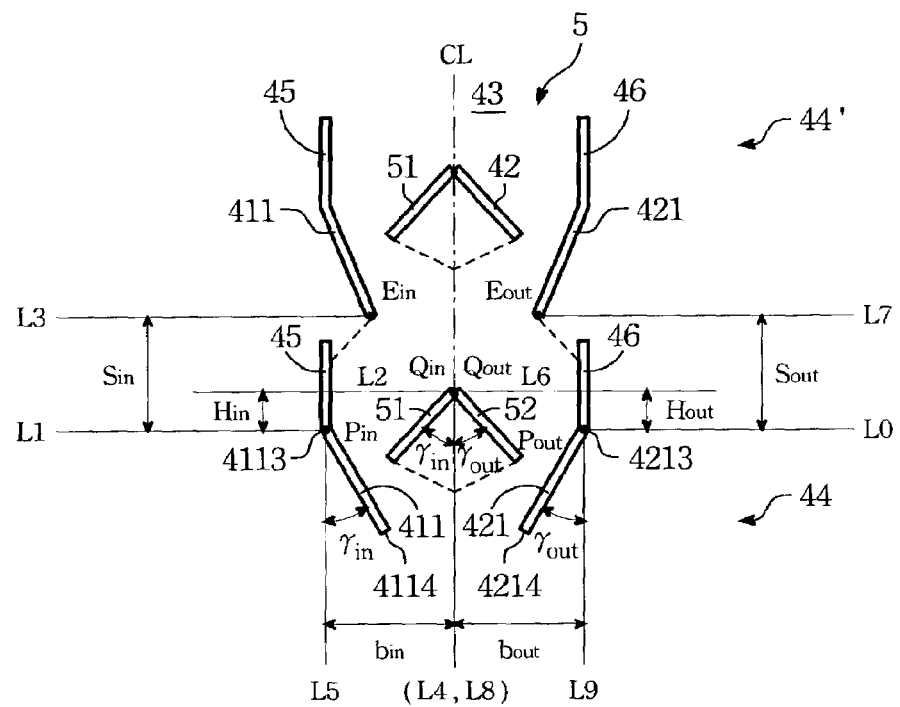
FIG. 5F is a schematic cross-sectional view of a sixth embodiment of two adjacent hopper-shaped structures of the granular moving-bed apparatus in according to the first aspect of the present invention.
Figure 6A:
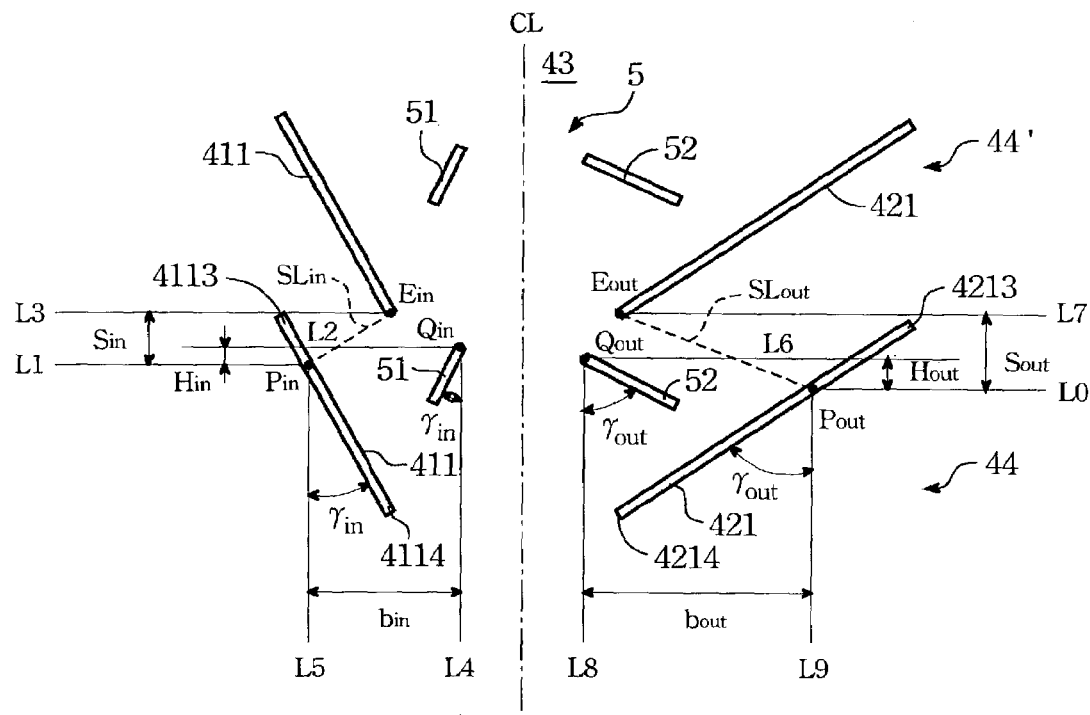
FIG. 6A is a schematic cross-sectional view of a first embodiment of two adjacent hopper-shaped structures of the granular moving-bed apparatus in according to a second aspect of the present invention.
Figure 6B:
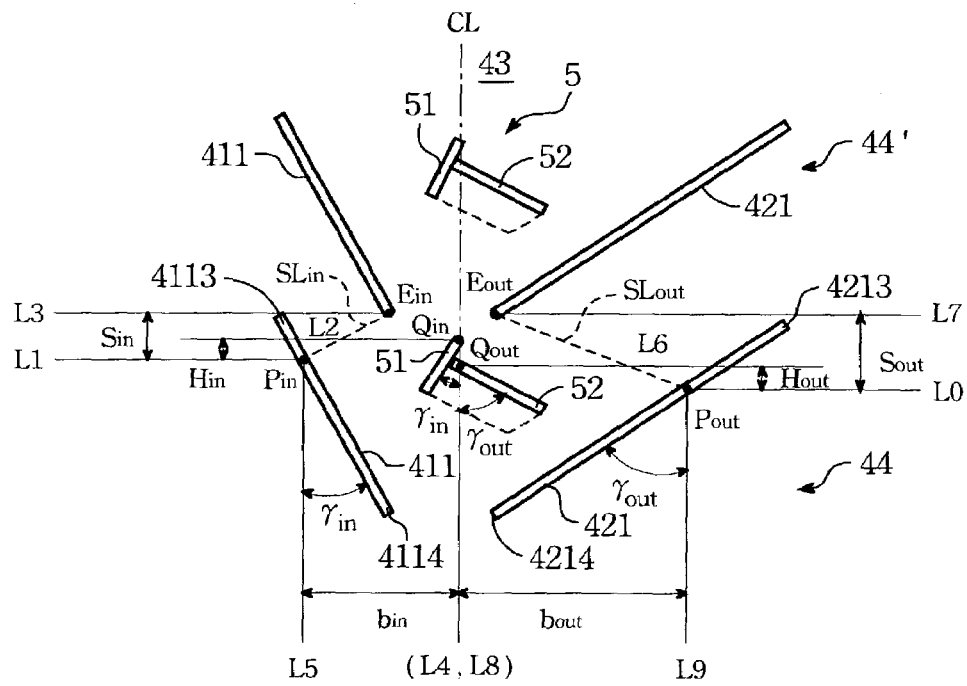
FIG. 6B is a schematic cross-sectional view of a second embodiment of two adjacent hopper-shaped structures of the granular moving-bed apparatus in according to the second aspect of the present invention.
Figure 6C:
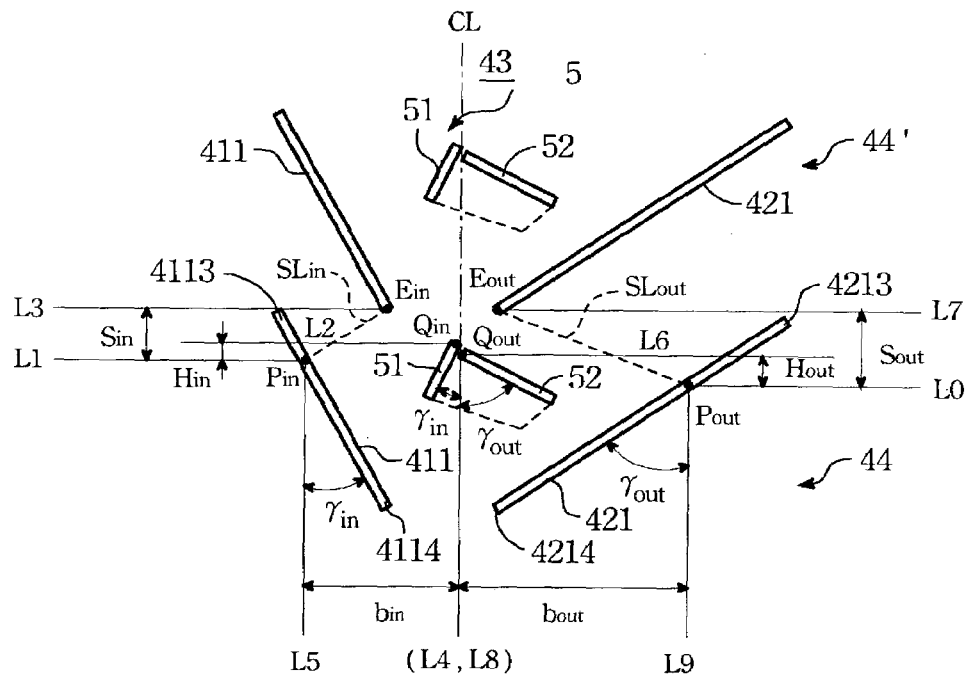
FIG. 6C is a schematic cross-sectional view of a third embodiment of two adjacent hopper-shaped structures of the granular moving-bed apparatus in according to the second aspect of the present invention.
Figure 6D:
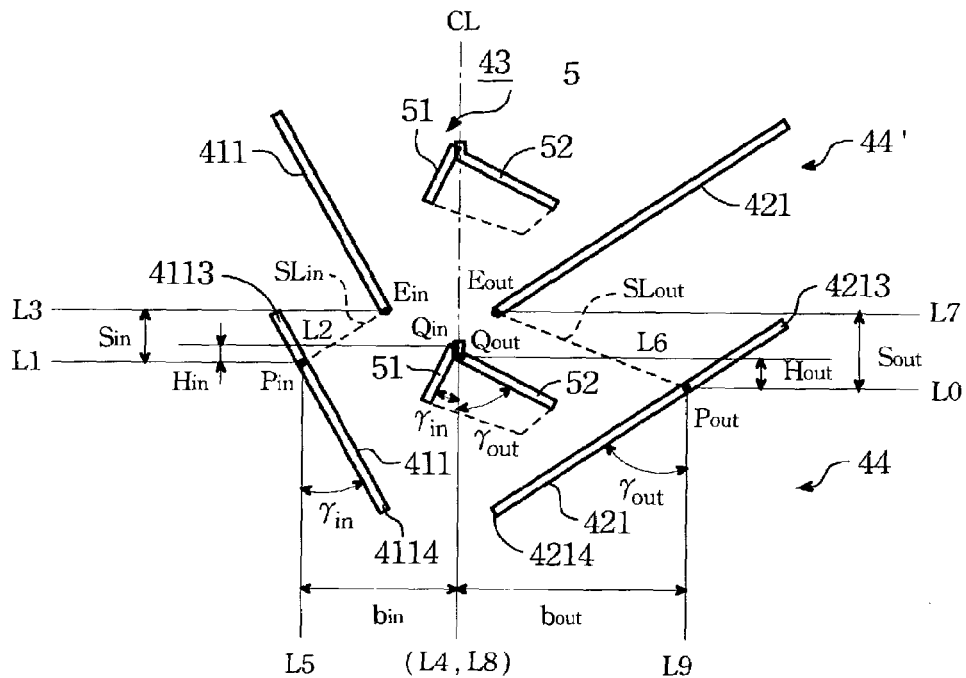
FIG. 6D is a schematic cross-sectional view of a fourth embodiment of two adjacent hopper-shaped structures of the granular moving-bed apparatus in according to the second aspect of the present invention.
Figure 6E:
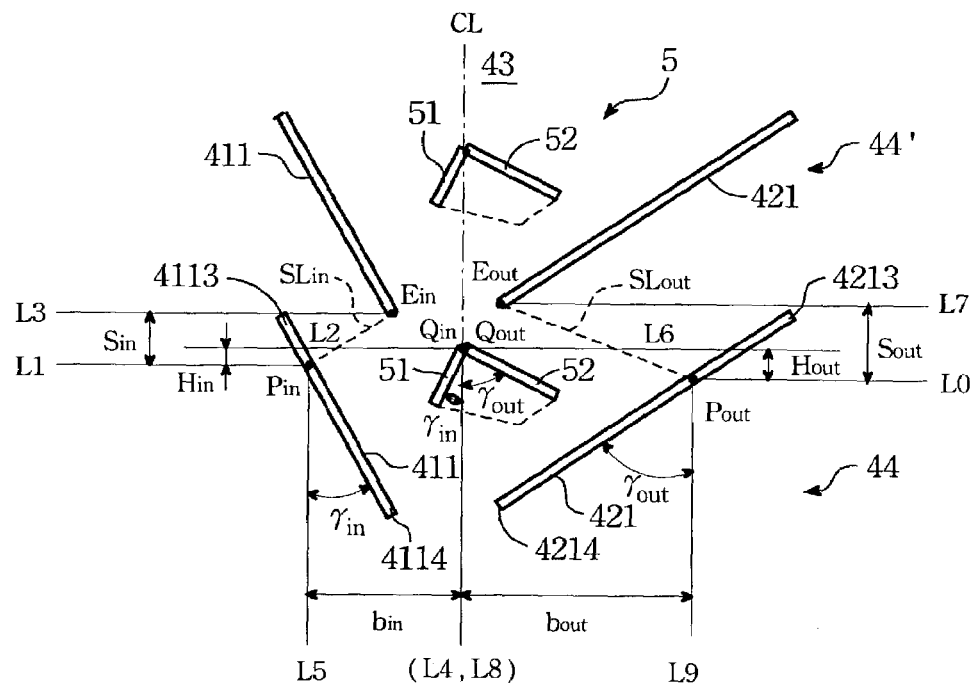
FIG. 6E is a schematic cross-sectional view of a fifth embodiment of two adjacent hopper-shaped structures of the granular moving-bed apparatus in according to the second aspect of the present invention.
Figure 6F:
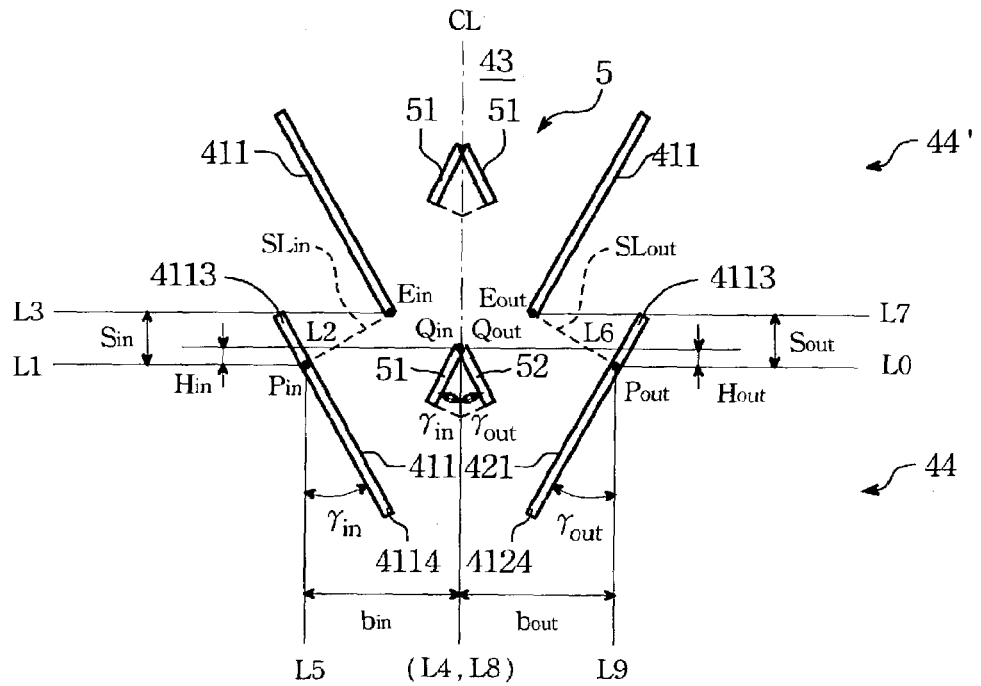
FIG. 6F is a schematic cross-sectional view of a sixth embodiment of two adjacent hopper-shaped structures of the granular moving-bed apparatus in according to the second aspect of the present invention.

Referring now to FIG. 5F, a sixth embodiment for the hopper-shaped structure 44 or 44' in accordance with the first aspect of the present invention is shown by a cross-sectional view. Different to the fifth embodiment of FIG. 5E, this embodiment has the $\gamma_{in}$ identical to the $\gamma_{out}$, and thus has the inlet guide plate 411 and the outlet guide plate 421 constructed symmetrically.

In the previous aspect of the present invention, the upright inlet and outlet fences 45 and 46 are used to prevent from overflowing of the granular materials. In a second aspect of the present invention, the upright inlet and outlet fences 45 and 46 are removed by profiling the inlet and outlet guide plates 411 and 421 with extended lengths so that the function of avoiding overflowing of the granular materials can still prevail.

FIG. 6A to FIG. 6F are used to illustrate various embodiments of the second aspect of the present invention. Individual requirements for each embodiment of the second aspect, i.e. FIG. 6A to FIG. 6F, are resembled respectively to those for aforesaid embodiment of the first aspect, FIG. 5A to FIG. 5F. Though criteria stated above for determining the $H_{in}$ and the $H_{out}$ are still applicable to this second aspect. Yet, the basic Pin and Pout for measuring are now shifted from the upper inlet and outlet ends 4113 and 4213 to an inlet and outlet hill-foot points, respectively. The hill-foot point is defined as the cross-section point of the granular-hill line SLin or SLout with the respective guide plate 411 or 421. Besides for the difference in defining the Pin and Pout, all other measurements and criteria for the first aspect are still applicable to the second embodiment of the present invention.

Figure 7:
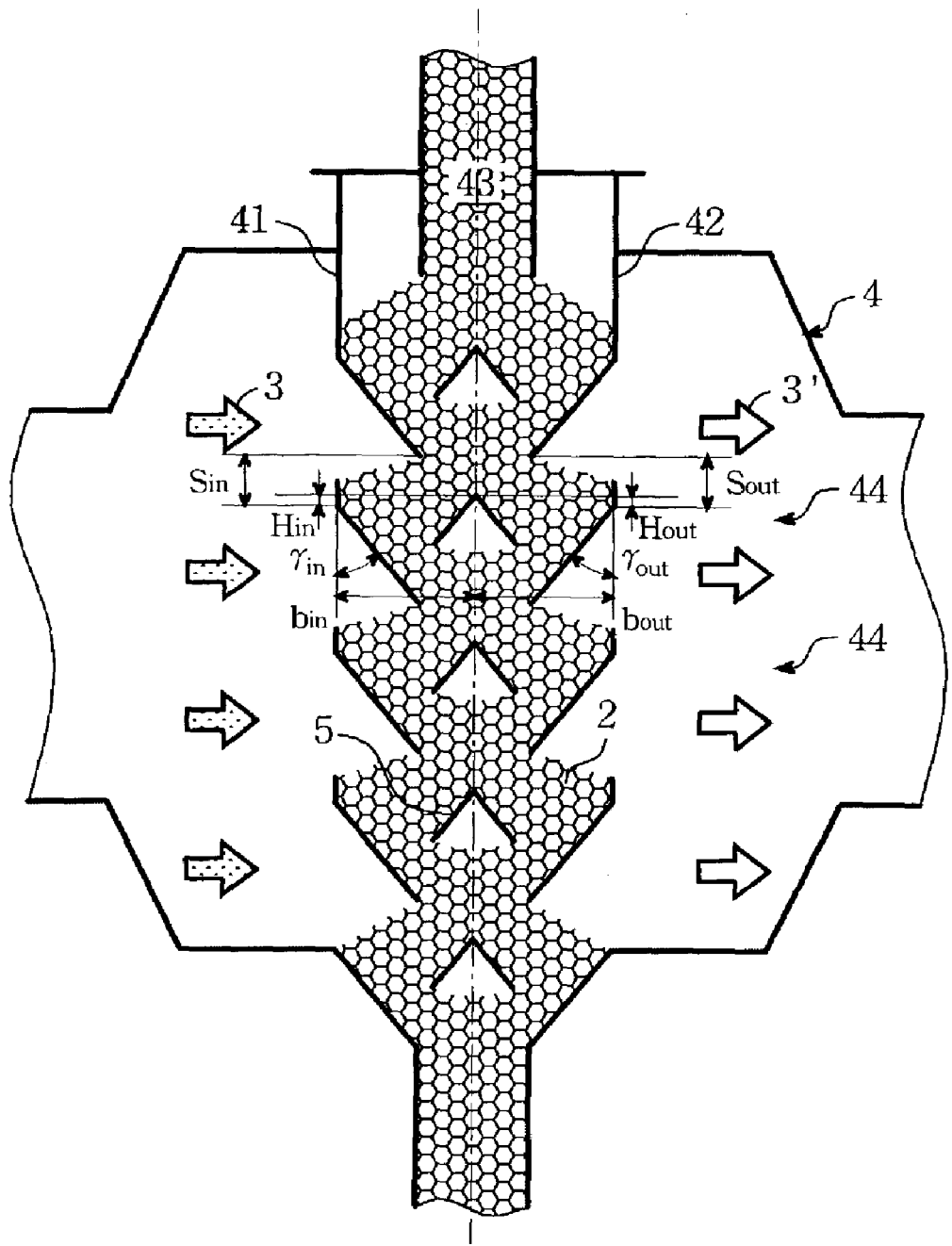
FIG. 7 is a schematic cross-sectional view of an embodiment of the granular moving-bed apparatus in accordance with the present invention.

Referring now to FIG. 7, a schematic granular moving-bed apparatus in accordance with the present invention utilizing the hopper-shaped structures 44 of FIG. 5F is shown. In this embodiment, the apparatus 4 has a symmetric configuration. Thus, the $b_{in}$ is equal to the $b_{out}$, the $\gamma_{in}$ is equal to the $\gamma_{out}$, the $S_{in}$ is equal to the $S_{out}$, and thus the $H_{in}$ is equal to the $H_{out}$.

Figure 8:
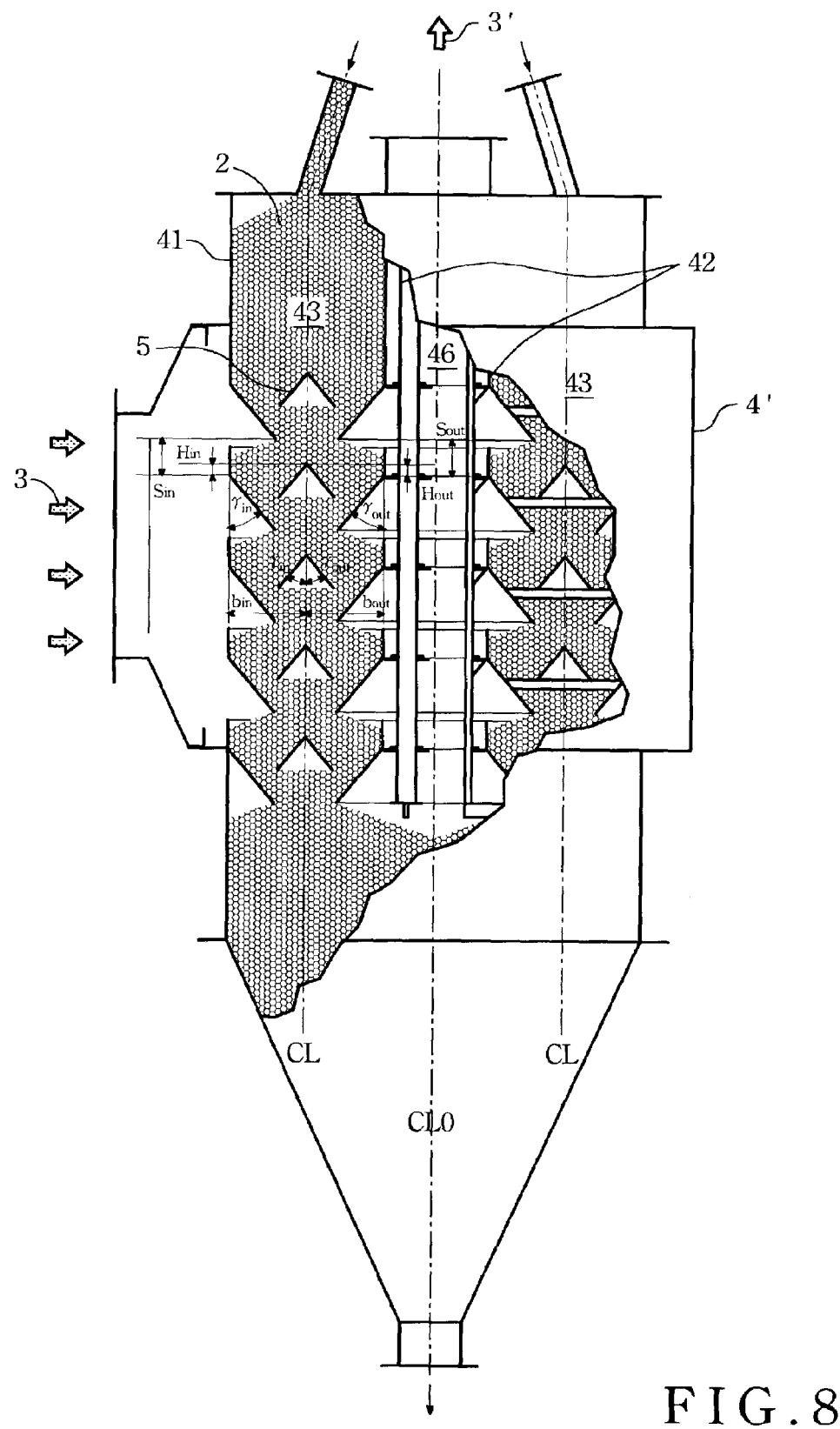
FIG. 8 is a schematic cross-sectional view of another embodiment of the granular moving-bed apparatus in accordance with the present invention.

Referring now to FIG. 8, another schematic granular moving-bed apparatus in accordance with the present invention utilizing the hopper-shaped structures 44 of FIG. 5F is shown. In this embodiment, the apparatus 4' is cylinder-shaped with the annular inlet louvered wall 41, the annular roof-shaped flow-corrective elements 5 as well as the annular granular path 43, and the annular outlet louvered wall 42 circling around a central gas path 46. The contaminated flow 3 is introduced from the periphery of the apparatus 4', pierces the granular path 43, and then leaves from the central gas path 46 as a filtrated flow 3'.

Figure 9:
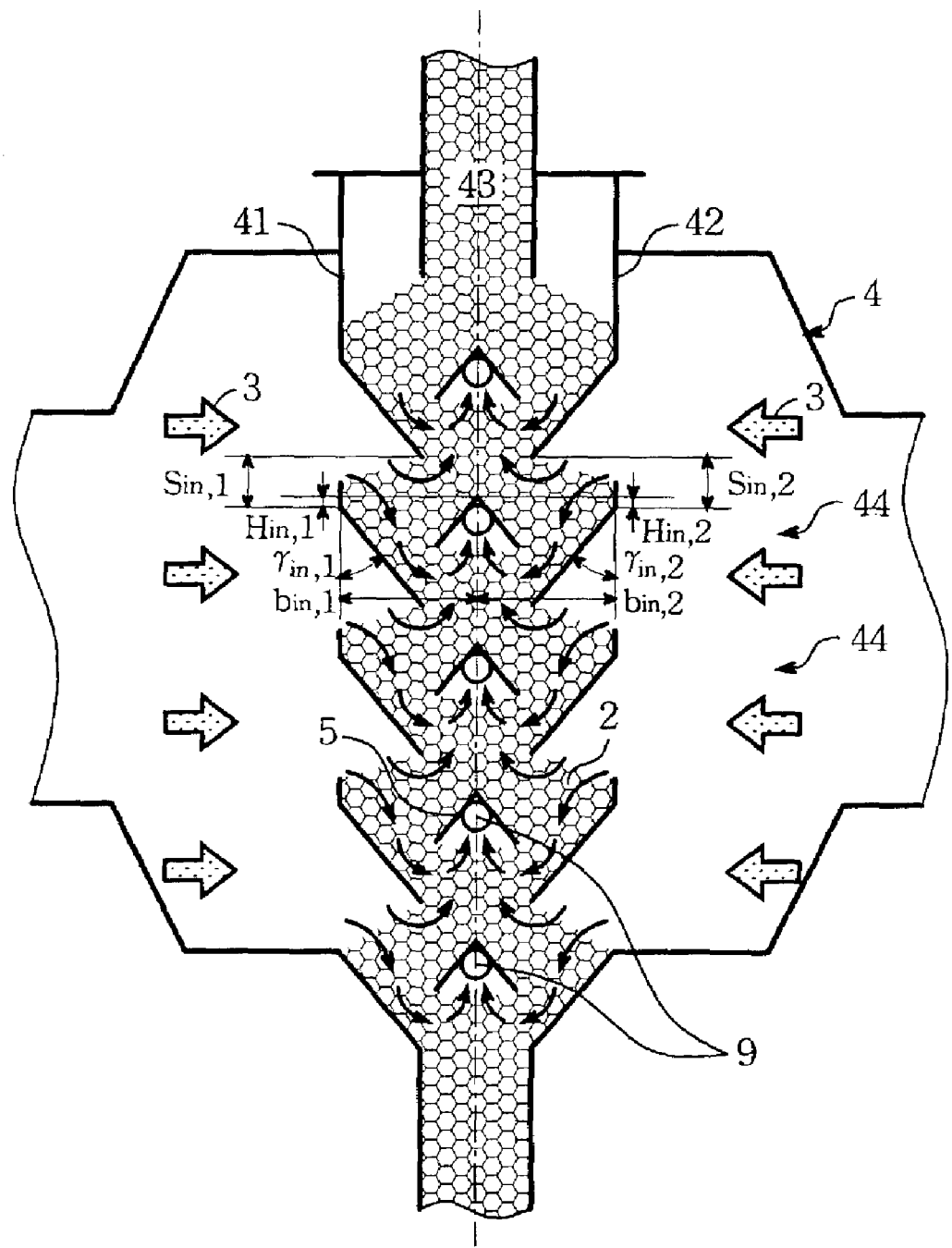
FIG. 9 is a schematic cross-sectional view of a further embodiment of the granular moving-bed apparatus in accordance with the present invention.

Referring now to FIG. 9, another schematic granular moving-bed apparatus in accordance with the present invention utilizing the hopper-shaped structures 44 of FIG. 5F is shown. In this embodiment, the apparatus 4 has a symmetric configuration as described in the embodiment of FIG. 7. Thus, the $b_{in,1}$ is equal to the $b_{in,2}$, the $\gamma_{in,1}$ is equal to the $\gamma_{in,2}$, the $S_{in,1}$ is equal to the $S_{in,2}$, and thus the $H_{in,1}$ is equal to the $H_{in,2}$. Yet, in this embodiment, outlet piping 9 is provided under each roof-shaped flow-corrective element 5 and the contaminated flows 3 are introduced from both sides of the apparatus. As shown, the contaminated flows 3 will dig in the granular path 43, thus get filtrated, and finally flee via the outlet piping 9.

Obviously, by providing the present invention to the granular moving-bed apparatus, locations for the roof-shaped flow-corrective elements 5 can be systematically determined, and thereby problems of corrosions, plaques, stagnant zones and so on formed to the louvered side walls of the apparatus can be avoided.

While the present invention has been particularly shown and described with reference to a preferred embodiment, it will be understood by those skilled in the art that various changes in form and detail may be without departing from the spirit and scope of the present invention.

We claim:

1. A granular moving-bed apparatus, including an inlet louvered wall, an outlet louvered wall opposing to the inlet louvered wall, a granular path formed between the inlet louvered wall and the outlet louvered wall, the granular path being configured for flowing thereinside a predetermined type of granular materials; each of the inlet louvered wall and the outlet louvered wall being constructed as a shutter wall so as to form a plurality of serial hopper-shaped structures for flowing the granular materials; each of the hopper-shaped structures being formed by an inlet guide plate of the inlet louvered wall and an outlet guide plate of the outlet louvered wall; the inlet guide plate, inclined by an angle $\gamma_{in}$", further having an inlet lower end and an inlet upper end; the outlet guide plate, inclined by an angle "$\gamma_{out}$," further having an outlet lower end and an outlet upper end; each of the hopper-shaped structures further having an inlet upright fence stading at the inlet upper end of the inlet guide plate and an outlet upright fence standing at the outlet upper end of the outlet guide plate; the granular path having thereinside a plurality of serial roof-shaped flow-corrective elements, each of the roof-shaped flow-corrective elements being corresponding to one of the hopper-shaped structures and further having an inlet corrective plate adjacent to the inlet guide plate and an outlet corrective plate adjacent to the outlet guide plate; the inlet corrective plate further having an inlet corrective tip; the outlet corrective plate further having an outlet corrective tip; the inlet upper end spacing from a line parallel to a centerline of the granular path and passing the inlet corrective tip by a length $_{in}$ the outlet upper end spacing from a line parallel to the centerline of the granular path and passing the outlet corrective tip by a length $_{out}$ the inlet upper end spacing from a line perpendicular to the centerline and passing the inlet lower end of a preceding hopper-shaped structure by a length $_{in}$ the outlet upper end spacing from a line perpendicular to the centerline and passing the outlet lower end of the preceding hopper-shaped structure by a length $_{out}$ the apparatus characterized in that: the inclination of the inlet corrective plate is equal to the $\gamma_{in}$, the inclination of the outlet corrective plate is equal to the $\gamma_{out}$, the inlet corrective tip is arranged above the inlet upper end by an inlet predetermined distance "$H_{in}$" ranged between 0.1 $S_{in}$ to 0.9 $S_{in}$, and the outlet corrective tip is arranged above the outlet upper end by an outlet predetermined distance $_{out}$ ranged between 0.1 $S_{out}$ to 0.9 $S_{out}$, wherein said inlet corrective tip and said outlet corrective tip are separated.

2. The granular moving-bed apparatus according to claim 1, wherein said granular material is a free-flowing cohesionless granular material whose effective angle of internal friction is ranged from 15° to 40° and said $H_{in}$ is equal to 0.1 $S_{in}$ for $H_o<0.1\ S_{in}$, $H_o$ for $<0.1\ S_{in}\ H_o<0.9\ S_{in}$ and 0.9 $S_{in}$ for 0.9 $S_{in}\ H_o$; in which $H_o=b_{in}\tan(34°-0.138\gamma_{in})$.

3. The granular moving-bed apparatus according to claim 1, wherein said granular material is a free-flowing cohesionless granular material whose effective angle of internal friction is ranged from 15° to 40°, and said $H_{out}$ is equal to 0.1 $S_{out}$ for $H_o<0.1\ S_{out}$, $H_o$ for 0.1 $S_{out}\ H_o<0.9\ S_{out}$ and 0.9 $S_{out}$ for 0.9 $S_{out}\ H_o$; in which $H_o=b_{out}\tan(34°-0.138\gamma_{out})$.

4. The granular moving-bed apparatus according to claim 1, wherein said granular material is a medium-flowability granular material whose effective angle of internal friction is ranged from 40° to 60°, and said $H_{in}$ is equal to 0.1 $S_{in}$ for $H_o$<0.1 $S_{in}$, $H_o$ for 0.1 $S_{in}$ $H_o$<0.9 $S_{in}$ and 0.9 $S_{in}$ for 0.9 $S_{in}$ $H_o$; in which $H_o$=$b_{in}$ tan(26.4°−0.072$\gamma_{in}$).

5. The granular moving-bed apparatus according to claim 1, wherein said granular material is a medium-flowability granular material whose effective angle of internal friction is ranged from 40° to 60°, and said $H_{out}$ is equal to 0.1 $S_{out}$ for $H_o$<0.1 $S_{out}$, $H_o$ for 0.1 $S_{out}$ $H_o$<0.9 $S_{out}$ and 0.9 $S_{out}$ for 0.9 $S_{out}$ $H_o$; in which $H_o$=$b_{out}$ tan(26.4°−0.072$\gamma_{out}$).

6. The granular moving-bed apparatus according to claim 1, wherein said granular material is a cohesive granular material whose effective angle of internal friction is ranged from 60° to 75°, and said $H_{in}$ is equal to 0.1 $S_{in}$ for $H_o$<0.1 $S_{in}$, $H_o$ for 0.1 $S_{in}$ $H_o$<0.9 $S_{in}$ and 0.9 $S_{in}$ for 0.9 $S_{in}$ $H_o$; in which $H_o$=$b_{in}$ tan(10°−0.034$\gamma_{in}$).

7. The granular moving-bed apparatus according to claim 1, wherein said granular material is a cohesive granular material whose effective angle of internal friction is ranged from 60° to 75°, and said $H_{out}$ is equal to 0.1 $S_{out}$ for $H_o$<0.1 $S_{out}$, $H_o$ for 0.1 $S_{out}$ $H_o$<0.9 $S_{out}$ and 0.9 $S_{out}$ for 0.9 $S_{out}$ $H_o$; in which $H_o$=$b_{out}$ tan(10°−0.034$\gamma_{out}$).

8. The granular moving-bed apparatus according to claim 1, wherein said inlet corrective tip lies on the center line.

9. The granular moving-bed apparatus according to claim 1, wherein said outlet corrective tip lies on the center line.

10. The granular moving-bed apparatus according to claim 1, wherein said inlet corrective tip and said outlet corrective tip are overlapped so as to form said roof-shaped flow-corrective element as a unit piece.

11. The granular moving-bed apparatus according to claim 1, wherein said $\gamma_{in}$ is equal to said $\gamma_{out}$.

12. The granular moving-bed apparatus according to claim 1, wherein said $b_{in}$ is equal to said $b_{out}$.

13. The granular moving-bed apparatus according to claim 1, wherein said $S_{in}$ is equal to said $S_{out}$.

14. The granular moving-bed apparatus according to claim 1, wherein said $H_{in}$ is equal to said $H_{out}$.

15. A granular moving-bed apparatus, including an inlet louvered wall, an outlet louvered wall opposing to the inlet louvered wall, a granular path formed between the inlet louvered wall and the outlet louvered wall, the granular path being configured for flowing a predetermined type of granular materials flowing along the granular path; each of the inlet louvered wall and the outlet louvered wall being constructed as a shutter wall so as to form a plurality of serial hopper-shaped structures for flowing the granular materials; each of the hopper-shaped structures being formed by an inlet guide plate of the inlet louvered wall and an outlet guide plate of the outlet louvered wall; the inlet guide plate, inclined by an angle "$\gamma_{in}$", further having an inlet lower end; the outlet guide plate, inclined by an angle "$\gamma_{out}$", further having an outlet lower end; the granular path having thereinside a plurality of serial roof-shaped flow-corrective elements, each of the roof-shaped flow-corrective elements being corresponding to one of the hopper-shaped structures and further having an inlet corrective plate adjacent to the inlet guide plate and an outlet corrective plate adjacent to the outlet guide plate; the inlet corrective plate further having an inlet corrective tip; the outlet corrective plate further having an outlet corrective tip; the granular materials flowing along the granular path forming an inlet hill-foot point with each the inlet guide plate, the inlet hill-foot point spacing from a line parallel to a centerline of the granular path and passing the inlet corrective tip by a length $_{in}$ the granular materials flowing along the granular path forming an outlet hill-foot point with each the outlet guide plate, the outlet hill-foot point spacing from a line parallel to the centerline of the granular path and passing the outlet corrective tip by a length $_{out}$ the inlet hill-foot point spacing a line perpendicular to the centerline and passing the inlet lower end of a preceding hopper-shaped structure by a length $_{in}$ the outlet hill-foot point spacing a line perpendicular to the centerline and passing the outlet lower end of the preceding hopper-shaped structure by a length $_{out}$ the apparatus characterized in that: the inclination of the inlet corrective plate is equal to the $\gamma_{in}$, the inclination of the outlet corrective plate is equal to the $\gamma_{out}$, the inlet corrective tip is arranged above the inlet hill-foot point by an inlet predetermined distance "$H_{in}$" ranged between 0.1 $S_{in}$ to 0.9 $S_{in}$, and the outlet corrective tip is arranged above the outlet hill-foot point by an outlet predetermined distance $_{out}$ ranged between 0.1 $S_{out}$ to 0.9 $S_{out}$, wherein said inlet corrective tip and said outlet corrective tip are separated.

16. The granular moving-bed apparatus according to claim 15, wherein said granular material is a free-flowing cohesion-less granular material whose effective angle of internal friction is ranged from 15° to 40° and said $H_{in}$ is equal to 0.1 $S_{in}$ for $H_o$<0.1 $S_{in}$, $H_o$ for 0.1 $S_{in}$ $H_o$<0.9 $S_{in}$ and 0.9 $S_{in}$ for 0.9 $S_{in}$ $H_o$; in which $H_o$=$b_{in}$ tan(34°−0.138$\gamma_{in}$).

17. The granular moving-bed apparatus according to claim 15, wherein said granular material is a free-flowing cohesion-less granular material whose effective angle of internal friction is ranged from 15° to 40°, and said $H_{out}$ is equal to 0.1 $S_{out}$ for $H_o$<0.1 $S_{out}$, $H_o$ for 0.1 $S_{out}$ $H_o$<0.9 $S_{out}$ and 0.9 $S_{out}$ for 0.9 $S_{out}$ $H_o$; in which $H_o$=$b_{out}$ tan(34°−0.138$\gamma_{out}$).

18. The granular moving-bed apparatus according to claim 15, wherein said granular material is a medium-flowability granular material whose effective angle of internal friction is ranged from 40° to 60°, and said $H_{in}$ is equal to 0.1 $S_{in}$ for $H_o$<0.1 $S_{in}$, $H_o$ for 0.1 $S_{in}$ $H_o$<0.9 $S_{in}$ and 0.9 $S_{in}$ for 0.9 $S_{in}$ $H_o$; in which $H_o$=$b_{in}$ tan(26.4°−0.072$\gamma_{in}$).

19. The granular moving-bed apparatus according to claim 15, wherein said granular material is a medium-flowability granular material whose effective angle of internal friction is ranged from 40° to 60°, and said $H_{out}$ is equal to 0.1 $S_{out}$ for $H_o$<0.1 $S_{out}$, $H_o$ for 0.1 $S_{out}$ $H_o$<0.9 $S_{out}$ and 0.9 $S_{out}$ for 0.9 $S_{out}$ $H_o$; in which $H_o$=$b_{out}$ tan(26.4°−0.072$\gamma_{out}$).

20. The granular moving-bed apparatus according to claim 6, wherein said granular material is a cohesive granular material whose effective angle of internal friction is ranged from 60° to 75°, and said $H_{in}$ is equal to 0.1 $S_{in}$ for $H_o$<0.1 $S_{in}$, $H_o$ for 0.1 $S_{in}$ $H_o$<0.9 $S_{in}$ and 0.9 $S_{in}$ for 0.9 $S_{in}$ $H_o$; in which $H_o$=$b_{in}$ tan(10°−0.034$\gamma_{in}$).

21. The granular moving-bed apparatus according to claim 15, wherein said granular material is a cohesive granular material whose effective angle of internal friction is ranged from 60° to 75°, and said $H_{out}$ is equal to 0.1 $S_{out}$ for $H_o$<0.1 $S_{out}$, $H_o$ for 0.1 $S_{out}$ $H_o$<0.9 $S_{out}$ and 0.9 $S_{out}$ for 0.9 $S_{out}$ $H_o$; in which $H_o$=$b_{out}$ tan(10°−0.034$\gamma_{out}$).

22. The granular moving-bed apparatus according to claim 15, wherein said inlet corrective tip lies on the center line.

23. The granular moving-bed apparatus according to claim 15, wherein said outlet corrective tip lies on the center line.

24. The granular moving-bed apparatus according to claim 15, wherein said inlet corrective tip and said outlet corrective tip are overlapped so as to form said roof-shaped flow-corrective element as a unit piece.

25. The granular moving-bed apparatus according to claim 15, wherein said $\gamma_{in}$ is equal to said $\gamma_{out}$.

26. The granular moving-bed apparatus according to claim 15, wherein said $b_{in}$ is equal to said $b_{out}$.

27. The granular moving-bed apparatus according to claim 15, wherein said $S_{in}$ is equal to said $S_{out}$.

28. The granular moving-bed apparatus according to claim 15, wherein said $H_{in}$ is equal to said $H_{out}$.

* * * * *